Jan. 8, 1929.  1,698,485
M. P. WEIMAR
UNIVERSAL CLAMPING BUNG OR PLUG FOR STEEL DRUMS
Filed Nov. 22, 1924
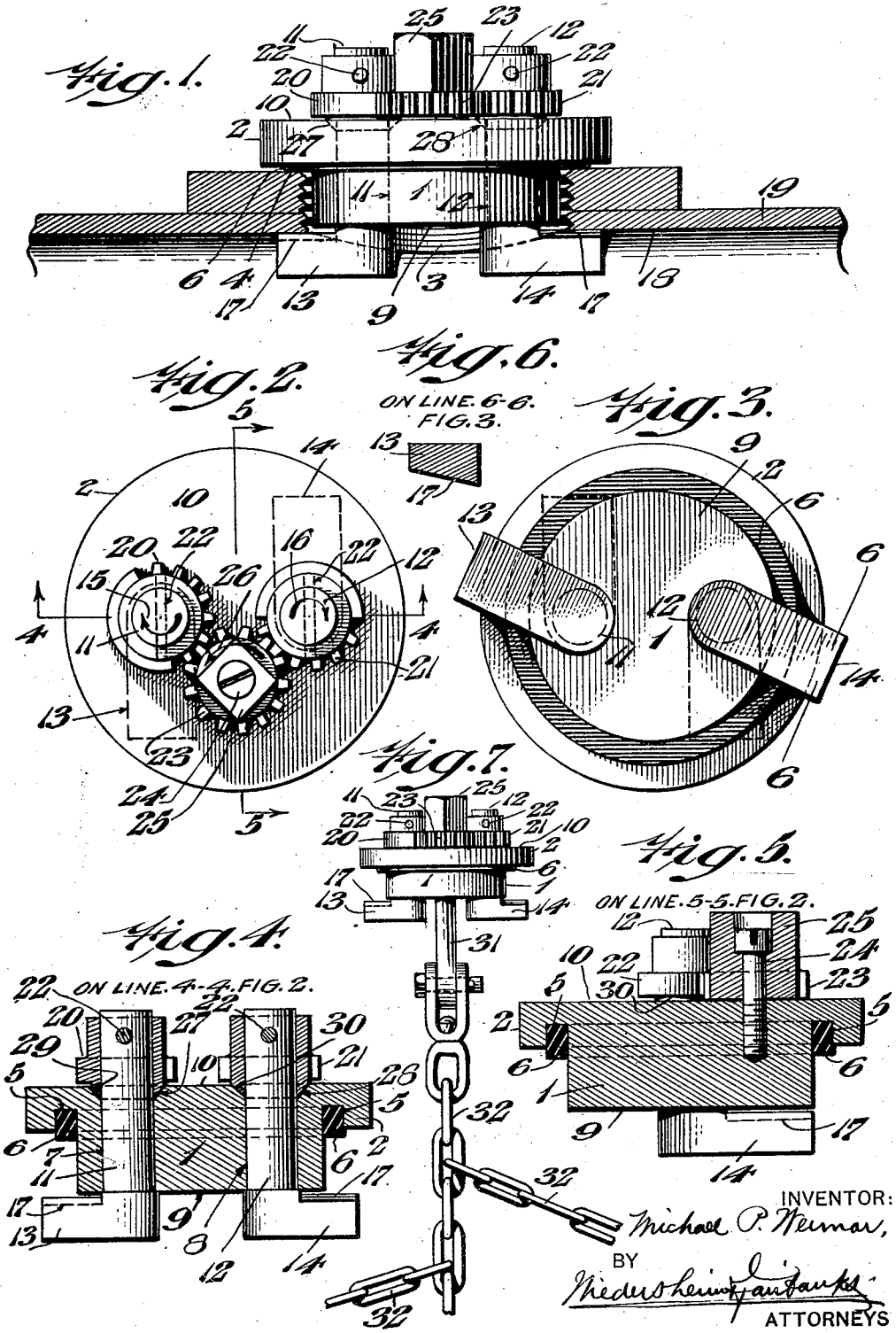
INVENTOR:
Michael P. Weimar,
BY
ATTORNEYS Patented Jan. 8, 1929.

1,698,485

UNITED STATES PATENT OFFICE.

MICHAEL P. WEIMAR, OF PHILADELPHIA, PENNSYLVANIA.

UNIVERSAL CLAMPING BUNG OR PLUG FOR STEEL DRUMS.

Application filed November 22, 1924. Serial No. 751,440.

My invention relates to a new and useful construction in bungs for steel drums and the like, which is adapted to be used on steel drums having openings of varying sizes and also steel drums having bung holes with various different sized and style of screw threads, its purpose being to readily fit any bung hole, within a certain range as to size, and also to fit in such bung hole regardless of the shape or size of the screw thread in said hole.

My invention further relates to a bung or plug for steel drums and the like, which need not be threaded in the opening as is commonly the practice, thus necessitating the time consuming operation of removing or inserting such plugs, but which bung or plug may be secured fluid tight in any bung hole by simply turning a single handle or wrench, whereby said bung will be clamped tight on said bung hole.

With the above objects in view my invention consists of a metallic bung having a plug or body portion, and outer flanges of larger diameter and preferably integral therewith, there being a packing ring of some suitable packing, extending around said plug or body portion, and secured within a suitable recess in said flange, said packing ring being adapted to engage and rest against the outer edge of the bung hole.

My invention further consists of a plurality of wedge shaped clamping devices on the inner side of said plug, carried by clamping shafts extending through said plug to the outer side thereof, and adapted to rotate with said shafts; toothed wheels carried by the outer ends of said shaft, and a single operating gear or pinion rotatably mounted on the outside of the plug and in mesh with each of the toothed wheels of the clamping shafts, said operating gear or pinion having a suitable stem or shank whereby the same may be turned so as to rotate said wedge shaped clamps into and out of engagement with the inner surface of the drum.

My invention further consists of certain novel valve seats in said plug, and corresponding valve surfaces on said toothed wheels, seated in said valve seats, whereby the shafts and shaft openings will be packed tightly when the clamps are in operative engagement with the steel drum thus eliminating any leakage of the fluid contained within the drums.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the drawings in which like reference characters indicate like parts,

Figure 1 represents a front elevation of my novel universal clamping bung or plug embodying my invention, showing a longitudinal section of a portion of a steel drum to which said bung is applied.

Figure 2 represents a plan view of the bung shown in Figure 1.

Figure 3 represents a bottom plan view of the same.

Figure 4 represents a section on the line 4—4 of Figure 2.

Figure 5 represents a section on line 5—5 Figure 2.

Figure 6 represents a section on line 6—6 of Figure 3.

Figure 7 represents a front elevation of a bung of my novel construction illustrating one of its uses.

Similar numerals of reference indicate corresponding parts in the figures,

Referring to the drawings, 1 designates the body of the bung, usually of a cylindrical shape, and of a diameter sufficiently small to fit within the desired bung hole clear of the screw threads. The flange 2 surrounding the upper portion of the plug 1 is preferably formed integral therewith, and is adapted to rest on the outer edges of the bung hole 3. In order to provide a tight packing of the joint between the outer edge 4 of the bung hole and, said flange 2 there is provided an annular recess 5 of any suitable shape or width into which is forced a packing ring 6, of any suitable material such as lead, rubber fibre, or rubberized fabrics. The plug 1 is provided with two or more shaft bearing openings 7 and 8 extending through the same, from the inner surface 9 of the outer surface 10 thereof. The clamping shafts 11 and 12 are rotatably mounted in said bearing openings 7 and 8 respectively and carry the wedge shaped clamps 13 and 14 respectively, as shown in section in Figure 6, which clamping members are preferably formed integral with the shafts 11 and 12 respectively. Thus by turning the shafts 11 and 12, in the directions indicated by the arrows 15 and 16, the clamps 13 and 14 will be turned from their inoperative positions shown in dotted lines in Figure 3, to their operative positions shown in full lines in the same figure, thereby engaging by means of the inclined wedging surfaces 17, the inner surface 18 of the steel drum 19, thereby drawing said flange and hence said packing ring 6, tight against the outer surface 4 of the bung hole 3.

In order to revolve said clamps 13 and 14 in unison with each other, the clamping shafts 11 and 12 are provided at their outer ends with toothed wheels 20 and 21 which are secured fixedly to said outer ends of the shaft 11 and 12 by any suitable means such as the pins 22.

The gear 23 is rotatably mounted on the pivot or stud 24, as shown particularly in Figure 5, and is so located as to be in mesh with the toothed wheels 20 and 21, thereby causing both the shafts 11 and 12 to rotate at the same time, when said gear 23 is revolved.

The gear 23 is moreover provided with a suitable shank or stem 25, preferably of a square or other polygonal shape, whereby said gear 23 may be engaged conveniently by a key or socket wrench, so as to turn the same into the open or closed position. Thus by applying my novel bung or plug to a steel drum, the gear 23 is revolved until the clamps 13 and 14 (Figure 2) are brought into the disengaged position shown in dotted lines in Figures 2 and 3, the plug is then inserted into the bung hole 3, and the gear 23 is again turned in the opposite direction indicated by the arrow 26, causing said toothed wheels 20 and 21 and hence the clamps 13 and 14 to rotate in the direction of the arrows 15 and 16, thereby bringing said wedging surfaces of said clamps into operative engagement with the inner surface 18 of the steel drum 19, thereby effecting a clamping and locking action on the plug 1 and ring 6.

In order to remove the bung or plug 1 from the steel drum, it is only necessary to again rotate the gear 23 with the aid of a suitable socket wrench or key in a direction opposed to the arrow 26 (Figure 2), thereby withdrawing said clamps 13 and 14 from the operative or clamping positions shown in Figures 1 and 3, and then withdrawing the bung or plug 1 from the opening 3.

In order to produce a fluid tight joint between the shaft bearing openings 7 and 8, and the respective shafts 11 and 12, I provide suitable bevelled packing seats 27 and 28 around the upper edges of the shaft bearing openings 7 and 8, and provide corresponding bevelled packings 29 and 30 around the bottom edges of the toothed wheels 20 and 21, adapted to seat in said seats, and to contact with the same in a fluid tight manner when said seats 27 and 28 and bevelled edges 29 and 30 are drawn together by the wedging action of the clamps 13 and 14. By this means an absolutely fluid tight joint is produced not only at the edges of the bung hole by means of the packing 6, but also around the clamping shafts 11 and 12 which extend through the plug 1.

My novel universal clamping bung or plug is adapted for any bung hole in steel drums or the like, of varying diameters within a certain range adapted to be fitted by one size plug, depending on the width of the packing ring 6. The plug may be made up in a number of different sizes so that with but a few sizes of these universal bungs or plugs it is possible to fit any bung hole which is encountered in practice.

My novel universal clamping bung or plug may be used either as a permanent closure for steel drums or the like, or it may be used as a temporary closure in case of transporting fluid for short distances, as for instance within a plant or factory.

My novel clamping bung is of particular utility and advantage however where such bung or plug must be inserted and removed quickly and rapidly and where it is to remain in place for only a short period of time, such as is the case in washing or cleaning steel drums.

In cleaning steel drums in the usual manner, a cleaning fluid is placed in the drum, a cleaning chain 32, (Figure 7) secured to the bung or plug, is then inserted into the steel drum, and the bung is secured within the bung hole. The steel drum is then revolved for a certain length of time, until the chain within the steel drum thoroughly cleans the inner surfaces.

By securing the eye bolt 31 to the inner side of my novel bung or plug as shown in Figure 7, it affords a ready means whereby the cleaning chain 32 may be secured to said bung or plug 1.

It will now be apparent that I have devised a novel and useful universal clamping bung or plug for steel drums which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a device of the character stated, a detachable plug, bearings extending through said plug, clamping shafts extending through and rotatably mounted within said bearings, clamps carried by the inner end of said shafts, seats surrounding the outer edges of said bearings, and corresponding packing devices carried by the clamping shafts and adapted to seat in said seats.

2. In a device of the character stated, a plug, a flange around the periphery thereof, a packing ring carried by said flange, a plurality of shaft bearing openings extending through said plug, clamping shafts rotatably mounted within said shaft bearing openings, clamps carried by said shafts, and means common to all of said clamping shafts to rotate said clamping shafts and clamping members simultaneously.

3. In a device of the character stated, a plug, a flange surrounding the same and integral therewith, a packing ring carried by said flange, a plurality of shaft bearing openings extending through said plug from the outer to the inner surface thereof, clamping shafts rotatably mounted within said shaft bearing openings, wedging clamps carried by each of said shafts at the inner ends thereof, a toothed wheel carried by the outer ends of said shafts, and a gear rotatably mounted on the outer side of the plug, in mesh with each of said toothed wheels.

4. In a device of the character stated, a detachable plug, bearings extending through said plug, clamping shafts extending through and rotatably mounted within said bearings, clamps carried by the inner ends of said shafts, seats surrounding the outer edges of said bearings, and corresponding packing devices carried by the clamping shafts and adapted to seat in said seats.

5. In a device of the character stated, a plug, a plurality of shaft bearing openings extending through said plug, clamping shafts rotatably mounted within said shaft bearing openings, clamps carried by the inner ends of said shafts, gears carried by each of said shafts and means for rotating said gears in unison.

6. In a device of the character stated, a removable plug, a packing ring for the outer portion thereof, said plug having longitudinal shaft bearings therein, clamping shafts rotatably mounted in said bearings, offset wedge shaped surfaces at the bottom of said shafts extending beyond the bottom periphery of said plug, gears on the upper ends of said shafts, a driving gear intermediate of and in mesh with said gears, and means for sealing the upper ends of the bearings for said shafts below said gears, when said shafts are drawn downwardly through said plug.

MICHAEL P. WEIMAR.